United States Patent [19]

Taubenmann

[11] 4,167,236

[45] Sep. 11, 1979

[54] APPARATUS FOR THE FEEDING OF LIQUID SYNTHETIC RESIN COMPONENTS

[75] Inventor: Peter Taubenmann, Munich, Fed. Rep. of Germany

[73] Assignee: Krauss-Maffei, Munich, Fed. Rep. of Germany

[21] Appl. No.: 782,962

[22] Filed: Mar. 30, 1977

[30] Foreign Application Priority Data

Mar. 31, 1976 [DE] Fed. Rep. of Germany ....... 2613771

[51] Int. Cl.² .............................................. B67D 5/02
[52] U.S. Cl. ..................................... 222/135; 222/334
[58] Field of Search ....................... 222/1, 63, 71, 129, 222/133, 134, 135, 333, 334

[56] References Cited

U.S. PATENT DOCUMENTS

| 2,946,488 | 7/1960 | Kraft | 222/134 |
|---|---|---|---|
| 3,107,034 | 10/1963 | Dunnous | 222/334 X |
| 3,227,325 | 1/1966 | Bates | 222/334 X |
| 3,814,289 | 6/1974 | Robbins | 222/135 |
| 3,871,556 | 3/1975 | Breer et al. | 222/134 X |
| 3,890,922 | 6/1975 | Nordenholt | 222/334 X |
| 3,908,862 | 9/1975 | Chandra et al. | 222/63 |

Primary Examiner—Joseph J. Rolla
Attorney, Agent, or Firm—Karl F. Ross

[57] ABSTRACT

A dosing unit for highly filled synthetic-resin components, usually a polyol and an isocyanate mixed with glass fiber, barite or chalk, comprises a piston which displaces the components or one of them, especially the filled component, under the control of fluid pressure. The change in the feed rate of the fluid-controlled unit is varied by varying the speed of the displacing member of the fluid-controlled unit which is preferably a piston-and-cylinder arrangement or a membrane or diaphragm-type displacement device.

2 Claims, 2 Drawing Figures

APPARATUS FOR THE FEEDING OF LIQUID SYNTHETIC RESIN COMPONENTS

FIELD OF THE INVENTION

The present invention relates to an apparatus for the feeding or dosing of liquid synthetic-resin components and, more particularly, to a dosing unit for highly-filled synthetic-resin components, especially adapted to react to produce polyurethane.

BACKGROUND OF THE INVENTION

The dosing of liquid synthetic-resin components, especially polyols and isocyanates for the production of polyurethane, must be carried out with the utmost care and concern for optimum mixing and displacement parameters if the desired results are to be obtained.

For precise dosing, numerous processes and devices have been proposed. For example, accurate dosing of the components to the mixing head can be effected for example by means of high speed axial-piston pumps.

However, if the synthetic-resin components have abrasive characteristics, i.e. contain abrasive fillers which operate physically and not chemically upon the moving parts, rapidly operating piston pumps are not suitable because they suffer significant mechanical wear.

Synthetic-resin components are considered abrasive when they are highly filled, i.e. when they contain various inorganic and organic fillers, extenders or pigments such as barite, glass fiber and clay. In the production of polyurethanes, such additives are commonly supplied to the polyol component.

It is nevertheless possible to operate with synthetic-resin components containing abrasive constituents when the displacement is effected by slowly operating piston pumps adapted to perform a single stroke for each dosing operation, i.e. to displace the entire of the component required for a single molding operation to the mixing head in a single stroke. Such slowly operating piston pumps are known.

In German open application (Offenlegungsschrift) DT-OS No. 1454898, there is described an apparatus for the dosing of synthetic-resin components whereby the change in the displacement quantity is effected by the substitution of piston pumps having pistons of different diameters and by a stepless variation of the stroke of these pumps. This arrangement has the disadvantage that it requires a large supply facility, substantial mounting work and high capital expenditure since a common support for the various pumps is expensive.

It is also known to carry out the dosing with slowly operating piston pumps which have effective piston surfaces which can be varied in steps. This conventional arrangement is expensive to construct originally and has the operating disadvantage that the piston surfaces are only stepped and hence a stepless control of the operation of the device is not possible.

OBJECTS OF THE INVENTION

It is the principal object of the present invention to provide an improved system for the dosing of liquid synthetic-resin components whereby the aforementioned disadvantages can be obviated.

Another object of the invention is to provide an apparatus for the improved dosing of highly filled liquid synthetic-resin components at least one of which has abrasive properties.

Still another object of the invention is to provide a system for the dosing of abrasive synthetic-resin components which eliminates the disadvantages of earlier systems, especially in the production of high pressure polyurethane, and yet affords exact dosing of the components at minimum cost.

A further object of the invention is to provide an improved apparatus for the purposes described which allows exact dosing of the synthetic-resin components at minimum capital expenditure.

SUMMARY OF THE INVENTION

These objects are attained, in accordance with the present invention, by providing a fluid-pressure responsive device having a displacement member which is actuatable by fluid pressure and can drive an abrasive liquid component to the mixing head. According to the invention, the displacement speed of this member is varied to permit control of the displacement rate, i.e. the displacement of the abrasive component per unit time, in a stepless manner.

According to the invention, the process comprises the dosing of liquid synthetic-resin components using a piston-and-cylinder unit in which a single displacement of the piston for each stroke drives the prescribed quantity of the component to the mixing head for a single mold operation. According to this aspect of the invention, the change in quantity per unit time of the piston-cylinder unit is effected by varying the piston speed. According to a preferred embodiment of the invention, the variation in the piston speed is effected by changing the rate of displacement of a fluid-pressure medium to this unit, i.e. a liquid which applies the displacement force to the piston of the unit.

Preferably the change in displacement (quantity of the abrasive component displaced) is effected by controlling the fluid pressure supplied to the unit by a variable-displacement or variable speed pump (hereinafter variable pump).

According to another aspect of the invention, an apparatus is provided for dosing the liquid synthetic-resin components using a piston-cylinder unit whereby the displacement of the piston through a single stroke feeds a predetermined and sufficient quantity of this component to the mixing head feeding a mold during each molding operation. According to this aspect of the invention, the piston-cylinder unit comprises a double piston which separates the dosing cylinder from a drive cylinder, the latter being supplied with the fluid-pressure medium by an adjustable pump. The fluid-pressure medium acts upon the double piston and, in turn, displaces the same to drive the liquid component to the mixing head. Advantageously, the variable pump is connected to the working chamber of the dosing cylinder through appropriate ducts which can include a pressure relief valve and be supplied from a reservoir for the pressure medium. The dosing cylinder or chamber, in turn, is connected to a source of the liquid component to be displaced to the mixing head via a respective duct which can be blocked.

Advantageously, a return line is connected to the pump and is branched to a control device which can block this line. The line may be provided, moreover, with a check valve. In the open condition of the control device, the adjustable pump circulates the fluid-pressure medium along a closed circulation path.

According to another preferred embodiment of the invention, the piston of the dosing cylinder and the piston of the working or drive cylinder can have different effective piston surface areas so that the piston-cylinder unit can serve as a pressure transformer.

According to the invention, the dosing of the liquid components can be carried out steplessly in an especially effective manner utilizing the advantages of the slowly operating piston pump at substantially reduced cost. This is in contrast to the conventional systems and can, without special equipment, be provided for the serial feeding of a plurality of control units and mixing heads.

The apparatus is best used for the production of mixtures capable of reaction to produce polyurethanes, in which case the abrasive liquid component will usually be the polyol to which the filler is added. The system of the invention where the double-chamber piston-and-cylinder unit is preferably then used for the dosing of the polyol. However, the unit is not limited to such operations and can be used for the dosing of synthetic-resins of all times. While I prefer to provide the apparatus for low-pressure as well as high-pressure mixing, best results are obtained when it is used for high pressure mixing.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
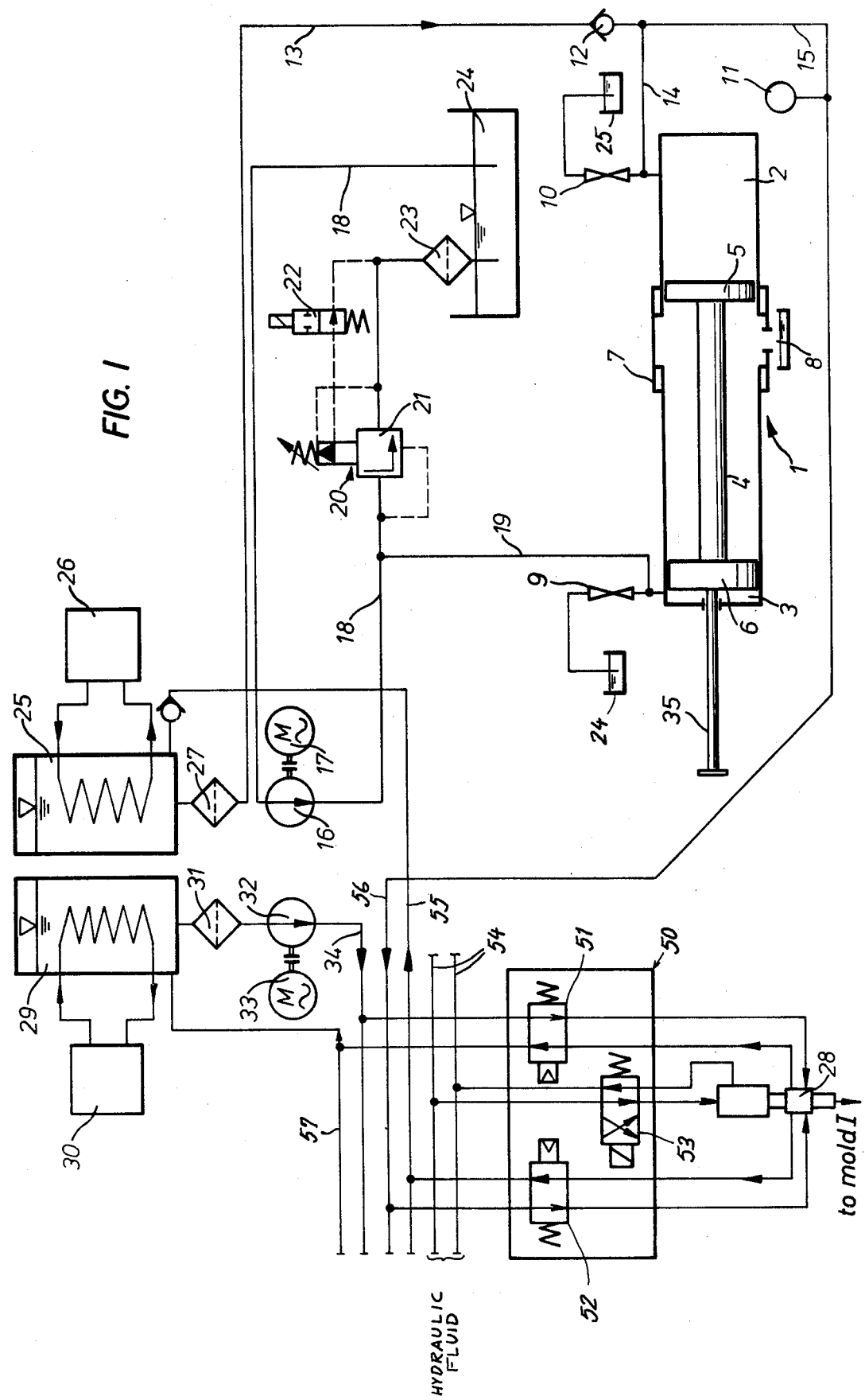
FIG. 1 is a flow diagram illustrating one embodiment of the invention.

In FIG. 1 of the drawing, there is shown a pair of supply vessels 29 and 25 containing the respective liquid synthetic-resin components for the formation of polyurethane, mainly, an isocyanate and a polyol, the latter containing a high proportion of fillers as described. The supply vessels are under pressure, e.g. air pressure, of substantially 3 to 6 bar. Temperature-control units 26 and 30 are provided to maintain predetermined temperature, of the components in the liquid state within the vessels 25 and 29 respectively.

The isocyanate component is drawn via a filter 31 and a pump 32, driven by an electric motor 33, from the vessel 29 and supplied via line 34 to the mixing head 28.

The dosing of the polyol component, containing the abrasive constituents, is effected via a piston-cylinder unit 1 which comprises a dosing cylinder 2 for displacement of the polyol and a working or drive cylinder 3 which is operated by a fluid-pressure medium free from abrasive components, e.g. hydraulic fluid or oil. The two cylinder chambers are separated by a double piston having a piston rod 4 and respective piston heads 6 and 5. The drive cylinder and the dosing cylinders are connected by a threaded sleeve 7 formed with an opening 8 for recovering any fluids which leak past the respective pistons.

The effective surface areas of the pistons 6 and 5 can be different so that the piston-cylinder unit 1 also serves as a pressure transformer, displacing the polyol component with a different pressure from that delivered in cylinder or chamber 3.

An adjustable pump 16 is provided which can operate at high pressures to, for example, 300 bar with relatively small displacement and hence low cost, for supplying the polyol component at lower pressure and a higher displacement rate.

Figure 2:
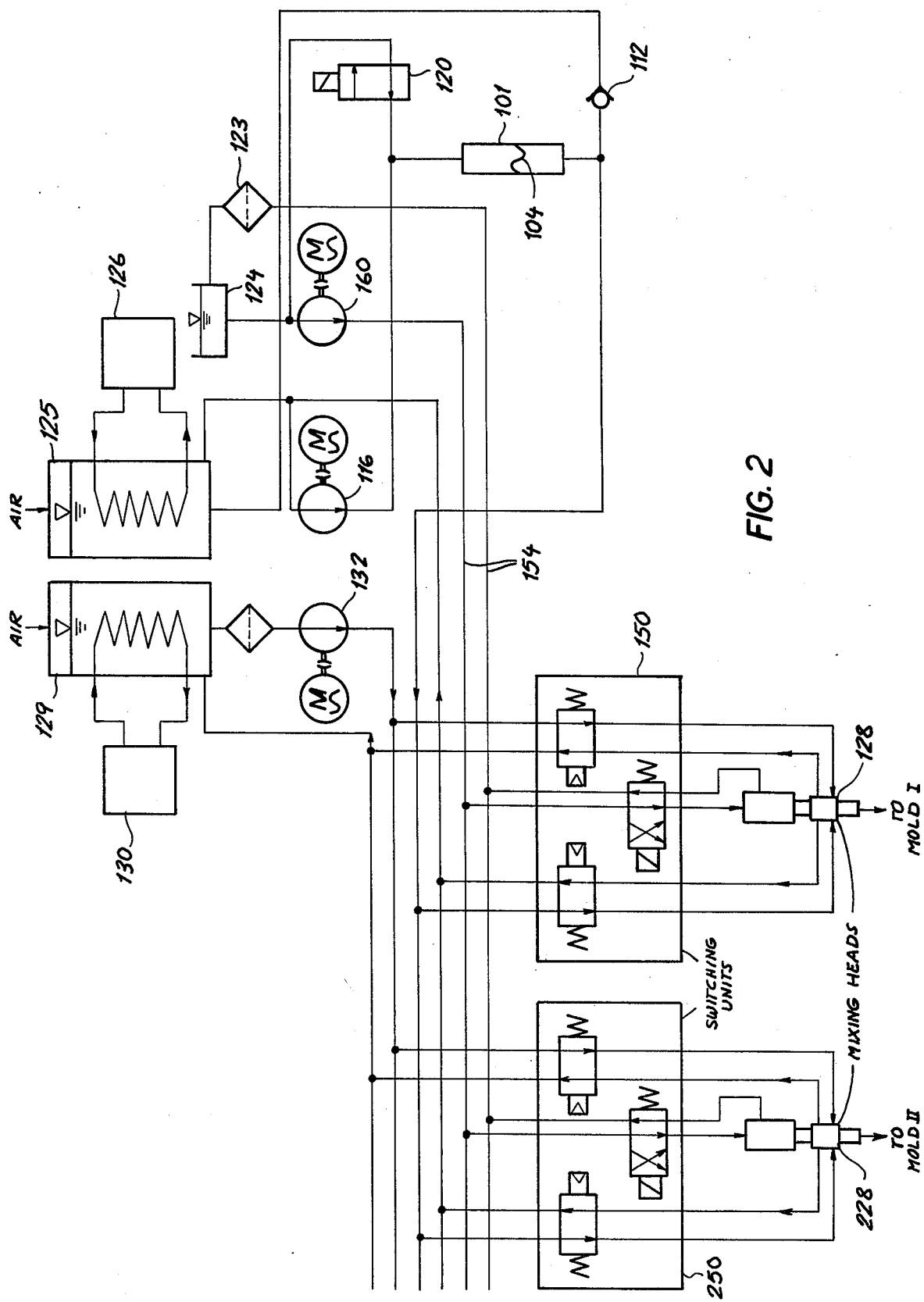
FIG. 2 is a flow diagram illustrating another embodiment thereof.

As can be seen in FIG. 2, the piston-cylinder unit 1 is equivalent to other conventional fluid-pressure actuated displacement devices such as the bellows or membrane accumulator represented in FIG. 2. Both of these devices are contemplated within the term "piston-cylinder unit" as this term is used in the present application.

The polyol component is drawn from the receptacle 25 through the filter 27 via lines 13 and 14 to the dosing cylinder or chamber 2 of the piston-cylinder unit.

The filter 27 can be, for example, a fine large-area sieve.

In line 13 there is provided a check valve 12 which permits the flow of the polyol component from the reservoir 25 unidirectionally to the dosing cylinder 2, but prevents return flow in the opposite direction. To vent air from the system and to discharge excess polyol component, a conventional venting valve 10 is provided at the inlet of the line 14 to the dosing cylinder 2.

It is possible, in accordance with the present invention, to provide a system for the rapid filling of the dosing cylinder 2 with the respective synthetic-resin component. To this end, a feed pump can be provided in the feed line 13. This pump can be a conventional rotary pump capable of operating at low pressure with abrasive liquids. Alternatively, the supply vessel 25 can be provided with a higher air pressure.

Once the dosing cylinder 2 is filled, with the piston, 4, 5, 6 in the left hand position illustrated the hydraulic medium can be fed to the cylinder 3 to drive the piston to the right and displace the polyol component via line 15 to the mixing head 28.

To protect the system against underpressures or overpressures and disruption resulting from either, a diagrammatically illustrated electric contact manometer 11 can be provided along the line 15 to shut off operation of the device should a pressure deviating from the normal operating range be detected.

The dosing of the synthetic-resin component by the piston-cylinder unit 1 is effected by varying the piston speed. In the illustrated embodiment, the variation of the piston speed is effected by changing the displacement rate or the pressure of the adjustable pump 16. The latter is connected by a clutch to the the motor 17 and displaces the hydraulic medium via lines 18, 19 from a supply reservoir 24 into the working or drive cylinder 3. At the inlet to the drive cylinder 3, a venting valve 9 can be provided.

Any suitable fluid can serve as the drive medium or piston-displacing fluid. Preferably the medium is conventional hydraulic or oil as noted.

During filling of the cylinder tube with the polyol component via line 14 under the pressure of the fluid in vessel 25 or via the feed pump mentioned, the control valve 20 is opened so that hydraulic fluid from the pump 16 is bypassed to the reservoir 24 and does not resist the displacement of the piston 4, 5, 6 to the left. The control valve 20 can include a main valve 21 and an electromagnetic precontrolled valve 22.

The reservoir 24 for the pressure medium is maintained preferably at atmospheric pressure. The variable pump 16 is preferably a rapidly operating piston pump with a speed of about 750 to 1500 rpm. Because it is possible to provide a pressure transformer in the piston-cylinder unit 1, the variable pump 16, which displaces oil and not the abrasive synthetic-resin component, can be an expensive relatively small pump capable of generating a maximum pressure of, say, 200 bar to 300 bar. The variable pump 16 can be driven continuously with the control unit 20 employed to maintain a pressureless state during filling of the cylinder 20. When the control valve 20 is switched over, pressure is built up at line 19 and in cylinder 3 and the piston 4, 5, 6 is displaced to the right. By varying the displacement per unit time of the variable pump 16, e.g. by tilting the control plate of the axial piston pump, it is possible to finely regulate the quantity of the polyol component which is displaced by the piston 4, 5, 6 to the mixing head 28.

Furthermore, it has been found to be advantageous to make the lines, the check valve 12 and the control unit 20 relatively short or of large cross section to reduce the flow resistance in the various flow passages.

The sequence of filling the molds is limited by the duration of filling of the dosing cylinder 2. For some purposes, a very brief sequencing time is desirable and, in this case, two piston-cylinder units can be provided to operate alternatively with respective control valves and feed pumps. Thus one of the piston-cylinder units can be filled while the other is discharging and vice versa. The control of the sequencing time can also be effected by varying the piston stroke with, for example, the aid of a control rod 35 connected to the piston and operating electric contacts (limit switches) regulating this stroke.

Naturally, the system of the present invention can also make use of other types of pumps, rather than the variable-displacement pump for the hydraulic medium previously described. For example, a constant-displacement pump may be used at 16 while the motor 17 is a variable speed motor so that the displacement per unit time is a function of the control of the speed of the drive motor.

As is also apparent from FIG. 1, mixing head 28 is of the recirculating self-cleaning type described and illustrated in U.S. Pat. No. 3,706,515, the cleaning member of which can be hydraulically displaceable via a reversing valve 53 connected to pressure lines 54.

In addition, each of the molds can be provided with a switching unit represented at 50 and having a pair of electrically actuated valves 51 and 52 for controlling, respectively, the feed of the synthetic-resin components to the mixing head 28.

In FIG. 2 we have shown another embodiment of the invention in which the supply vessels 125 and 129 for the polyol and isocyanate, respectively, are under air pressure and have respective temperature control units 126 and 120. The pumps 116 and 132 serve to feed the hydraulic pressure medium and the isocyanate component, respectively, as described, while another pump 160 feeds hydraulic fluid from the reservoir 124 to the pressure line 154, corresponding to lines 54 previously described. As in the embodiment of FIG. 1, a filter 123, analogous to the filter 23, is provided to remove contaminants from the return hydraulic fluid. In FIG. 2, the control unit 20 is formed by an electromagnetically operated valve 120 which, when opened, permits recirculation of the hydraulic medium. Each of the mixing heads 128, 228 to the respective molds I and II, representing any number of molds up to, for example, ten is provided with a respective switching unit 150, 250 etc.

In this embodiment, moreover, the piston-cylinder unit 1 is replaced by a membrane-diaphragm unit 101 whose membrane 104 forms the displacement member for the polyol component which, after being drawn into the lower chamber via the check valve 112, is displaced to the mixing head 128, 228 etc., as determined by the switching units 150, 250 in operation, as previously described. The system illustrated in FIG. 2 has been found to be effective for displacements of 300 to 8000 grams per second of the filled materials and can operate 1 to 10 mixing heads. They may use synthetic-resin components consisting of a polyol and an isocyanate mixed with glass fiber, barite, chalk or other fillers.

I claim:

1. An apparatus for dosing a liquid synthetic-resin component to a mixing head which comprises:
   a displacement unit comprising a cylinder and a piston in said cylinder subdividing same into a first chamber adapted to receive said component and connected to said mixing head, and a second chamber;
   a variable-displacement axial-piston pump having a variable piston stroke per revolution, said pump being connected to said second chamber for feeding a hydraulic medium thereto at a variable rate, thereby displacing said piston to drive said component to said mixing head;
   a source of said component;
   a conduit connecting said source with said first chamber;
   a check valve in said conduit permitting said component to flow from said source to said first chamber but preventing reverse flow of said component from said first chamber to said source;
   a reservoir for said hydraulic medium at atmospheric pressure, a duct connecting said reservoir with the intake side of said pump, a further duct connecting the discharge side of said pump with said reservoir; and
   valve means in said further duct openable to permit recirculation of said medium from said reservoir through said pump and back into said reservoir during the filling of said first chamber, the effective surface areas of said piston of said displacement unit in the respective chambers being different.

2. An apparatus for charging a mold with a mixture of reactive synthetic-resin components in a liquid state, one of said components containing an abrasive filler, said apparatus comprising:
   a first reservoir for said one of said components under elevated air pressure;
   a second reservoir for the other of said components under elevated air pressure;
   control means connected to a mixing head and having respective valves for said components;
   a displacement unit comprising a first chamber, a second chamber and a movable member disposed between said chambers;
   a first conduit connecting said first reservoir with said first chamber and provided with a check valve permitting said one of said components to flow under pressure into said first chamber but preventing reverse flow of said one of said components from said first chamber to said first reservoir;
   a second conduit connecting said first chamber to said mixing head through one of said valves of said control means;
   a variable pump having a discharge side connected to said second chamber for pressurizing same with a hydraulic medium to displace said member and drive said one of said components through second conduit to said mixing head;

a further pump connecting said second reservoir with said mixing chamber through the other valve of said control means to feed the other of said components to said mixing head for mixture with said one of said components, a plurality of such molds being provided, each of said molds having a respective mixing head and control means, said unit and said further pump being connected to the several control means in parallel, said unit comprising a cylinder and a piston in said cylinder subdividing same into said chambers and having different effective surface areas in said chambers;

a third conduit connecting a source of hydraulic medium to the intake side of said variable pump;

a fourth conduit connecting the discharge side of said variable pump to said source; and a valve in said fourth conduit for permitting, in a closed condition, pressure buildup in said second chamber, but recirculating said hydraulic medium from said variable pump to said source during filling of said first chamber with said one of said components, said variable pump being a variable-displacement axial-piston pump.

* * * * *